May 14, 1957     C. B. KIDWELL     2,792,163
SAW SCABBARD
Filed March 1, 1956
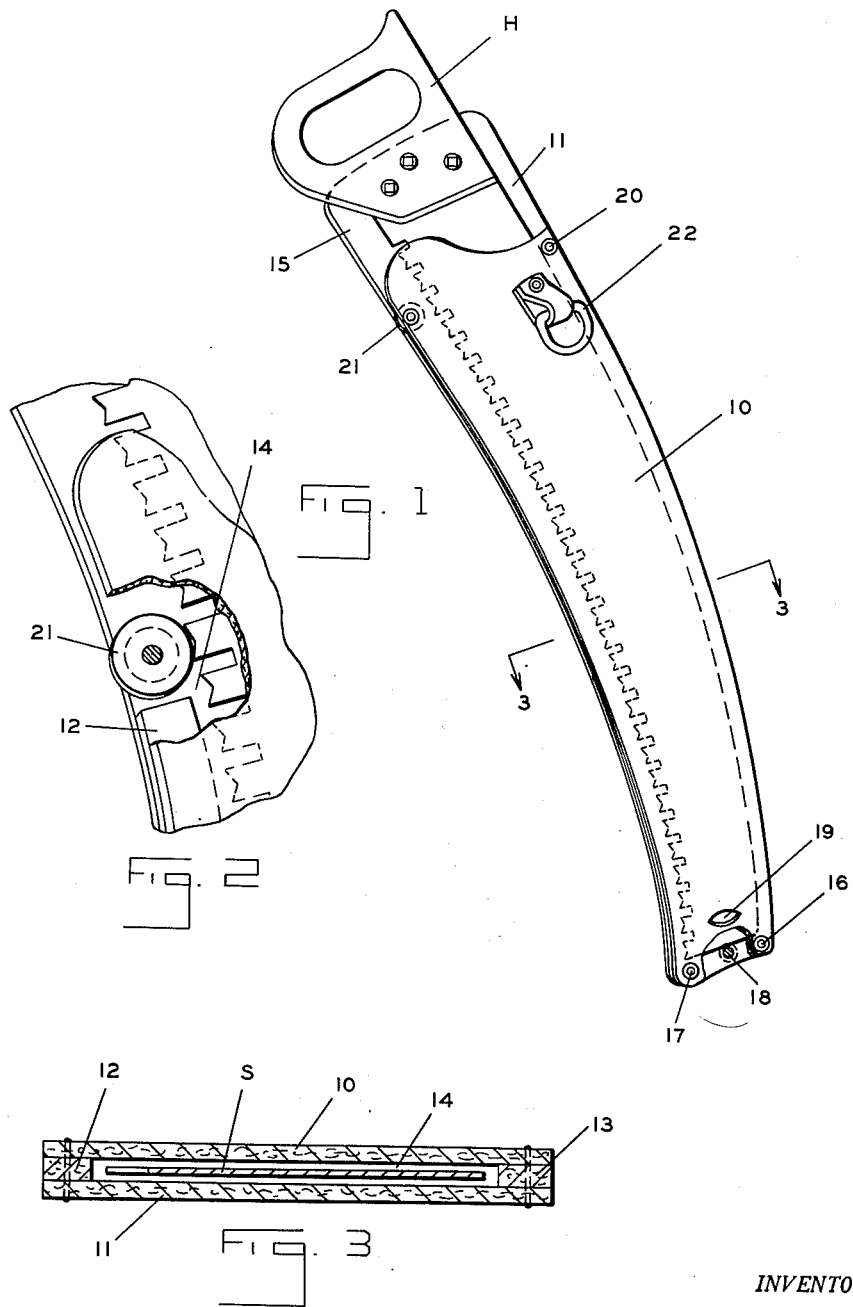
INVENTOR.
CLARENCE B. KIDWELL
BY
ATTORNEYS

United States Patent Office 2,792,163
Patented May 14, 1957

2,792,163

SAW SCABBARD

Clarence B. Kidwell, West Jefferson, Ohio

Application March 1, 1956, Serial No. 568,905

1 Claim. (Cl. 224—2)

My invention relates to a saw scabbard. It has to do, more particularly, with a saw scabbard which is particularly useful for the arcuate saws used by a tree trimmer who must have his hands free in working in a tree. The scabbard is designed to be carried on the belt of a tree trimmer.

The main difficulty with saw scabbards of this general type is that they quickly become cut and damaged by the sheathing and unsheathing of the saw. Since these saws are arcuate, the saw teeth soon cut through the material or the stitching or both at the adjacent edge of the scabbard, due to the tendency to move into contact with such edge during insertion and removal and since these scabbards are usually made of stitched leather as it has been found to be the most satisfactory material.

It is the object of my invention to provide a scabbard for a tree trimmer's arcuate saw, which is made of stitched leather or other suitable material, which is provided with means for preventing the teeth of the saw from cutting into the adjacent edge of the scabbard during the sheathing and unsheathing of the saw, and which will not interfere with the insertion or removal of the saw but will in fact facilitate these operations.

The preferred embodiment of my invention is illustrated in the accompanying drawing wherein similar characters of reference designate corresponding parts and wherein:

Figure 1 is a face view, partly broken away, of a saw scabbard made according to my invention.

Figure 2 is an enlarged face view, partly broken away, showing the guide roller with which the saw teeth will contact.

Figure 3 is a transverse sectional view taken along line 3—3 of Figure 1.

With reference to the drawing, I have illustrated my saw scabbard as being mainly of arcuate form and being of maximum width at its upper end and gradually decreasing in width towards its lower end. The scabbard is preferably made of heavy sole leather to resist wearing.

The scabbard is composed mainly of an outer side 10, an inner side 11, and edge spacer strips 12 and 13 which are disposed between the sides at their edges and all of which are stitched together. Thus, a socket 14 is provided between the outer and inner sides 10 and 11 for receiving the saw S which is of arcuate form and which decreases in width towards its lower end.

The inner side 11 extends upwardly beyond the outer side 10 to provide an upwardly projecting shield portion 15. The lower end of the scabbard is open and is provided with corner rivets 16 and 17 which aid in securing the sides and edge strips together and a central rivet 18 which contacts the lower end of the saw when it is in its socket 14. When the saw is in this position, the handle member H thereof projects upwardly beyond the shield 15. This facilitates gripping of the handle to remove the saw. Adjacent the lower end of the scabbard the outer side 10 is provided with an opening 19 through which twigs etc. will drop while small particles will drop through the open lower end of the socket.

A rivet 20 may be provided at the upper end of the outer side 10 to aid in holding the parts together. This rivet will be at the continuous edge of the saw when it is in the socket 14. At the opposite edge of the scabbard adjacent the upper end of the side 10, I provide the guide roller 21 which contacts with the serrated edge of the saw during sheathing and unsheathing of the saw. This roller is made of nonmetallic material such as Bakelite. It is rotatably mounted by a rivet just above the spacer strip 12 as shown in Figure 2. However, it projects inwardly into a socket 14 beyond this spacer strip. Thus, when the saw is inserted into or removed from the socket 14, there is a tendency for the saw to move bodily towards the concave edge of the scabbard due to the continuous curved edge of the saw contacting the opposed edger strip 13. The teeth instead of contacting the edger strip 12 will contact the roller 21 and the saw will be effectively guided into the socket. The same action occurs on removal of the saw from the socket 14. Thus, wear on the strip 12 will be precluded.

The outer side 10 of the scabbard carries a loop 22 adjacent its upper end by means of which the scabbard may be attached to the belt of a tree trimmer.

It will be apparent from the above description that I have provided a saw scabbard having many advantages, some of which have been mentioned above and others of which will be readily apparent.

Having thus described my invention, what I claim is:

A saw scabbard of arcuate form having a concavely curved edge and a convexly curved edge and comprising inner and outer flat sides having their edges secured together to provide a socket for receiving the saw blade of similar arcuate form with teeth along its concave edge, edge spacer strips secured between the inner and outer sides at said edges to space the sides to permit free insertion and removal of the saw, said socket being open at its upper end to provide for insertion and removal of the saw, and a non-metallic roller at the open end of the socket between the said inner and outer sides just inside the spacer strip at the concave edge which is adjacent the saw teeth on the concave edge of the saw for contacting therewith during the insertion and removal of the saw.

References Cited in the file of this patent

UNITED STATES PATENTS 2,524,110     Kuemmerling  ------------ Oct. 3, 1950

FOREIGN PATENTS 491,669     Great Britain ------------ Sept. 7, 1938
971,479     France ---------------- June 19, 1950